(12) United States Patent
Kim et al.

(10) Patent No.: US 11,411,425 B2
(45) Date of Patent: Aug. 9, 2022

(54) WIRELESS CHARGING DEVICE FOR SIMULTANEOUSLY CHARGING A PLURALITY OF USER TERMINALS BY PERFORMING TILT FUNCTION

(71) Applicant: LG ELECTRONICS INC., Seoul (KR)

(72) Inventors: Hwanyong Kim, Seoul (KR);
Kyunghwan Kim, Seoul (KR);
Hyoung Seok Kim, Seoul (KR);
Gyunghwan Yuk, Seoul (KR); Seong Hun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 16/688,661

(22) Filed: Nov. 19, 2019

(65) Prior Publication Data
US 2021/0013732 A1  Jan. 14, 2021

(30) Foreign Application Priority Data
Jul. 8, 2019  (KR) ........................ 10-2019-0082345

(51) Int. Cl.
*H02J 7/00* (2006.01)
*H02J 7/02* (2016.01)
*H02J 50/40* (2016.01)
*H01F 38/14* (2006.01)

(52) U.S. Cl.
CPC .............. *H02J 7/025* (2013.01); *H01F 38/14* (2013.01); *H02J 7/0044* (2013.01); *H02J 50/40* (2016.02)

(58) Field of Classification Search
CPC ........ H02J 7/025; H02J 50/005; H02J 7/0042; H02J 7/0044; H02J 50/10; H02J 50/20; H02J 50/05; H02J 2310/22; H02J 50/12; H02J 50/80; H02J 7/00036; H02J 7/0013; H02J 7/0027; H02J 7/0048; H02J 7/0049; H02J 7/04; H02J 7/342; H02J 7/35;
(Continued)

(56) References Cited

U.S. PATENT DOCUMENTS

| 2008/0258679 A1 | 10/2008 | Manico et al. |
| 2010/0248622 A1 | 9/2010 | Lyell Kirby et al. |
| 2013/0093220 A1 | 4/2013 | Pajic |

(Continued)

FOREIGN PATENT DOCUMENTS

| CN | 206049441 U | 3/2017 |
| JP | 2012-522483 A | 9/2012 |

(Continued)

*Primary Examiner* — Binh C Tat
(74) *Attorney, Agent, or Firm* — Birch, Stewart, Kolasch & Birch, LLP

(57) ABSTRACT

The present disclosure relates to a wireless charging device capable of efficiently charging one or more user terminals by performing a tilt function with respect to a portion where the user terminal is held. According to an embodiment of the present disclosure, the wireless charging device include a first body, a depression defined in the first body, a terminal holder that is coupled to an inner surface at both sides of the depression using a hinge and rotates with respect to the first body, a wireless charger disposed in the terminal holder, a second body connected to the first body and inclined with respect to the first body, and a display provided in the second body.

19 Claims, 14 Drawing Sheets

(58) Field of Classification Search
CPC .......... H02J 9/061; H02J 50/40; H02J 50/402; H02J 7/00032; H01M 50/109; H01M 50/216
USPC ................................................ 320/106–115
See application file for complete search history.

(56) References Cited

U.S. PATENT DOCUMENTS

| | | | |
|---|---|---|---|
| 2015/0002088 A1* | 1/2015 | D'Agostino .......... | H02J 7/0044 320/108 |
| 2016/0099578 A1 | 4/2016 | Hwang | |
| 2016/0254693 A1* | 9/2016 | Moon .................... | G06F 1/1632 320/108 |
| 2017/0163070 A1* | 6/2017 | Lawrenson ............. | H02J 50/90 |

FOREIGN PATENT DOCUMENTS

| | | | |
|---|---|---|---|
| JP | 2013-153877 A | | 8/2013 |
| JP | 2014-93912 A | | 5/2014 |
| JP | 2015-77142 A | | 5/2016 |
| KR | 10-2010-0015828 A | | 2/2010 |
| KR | 10-0976163 B1 | | 8/2010 |
| KR | 10-2014-0045126 A | | 4/2014 |
| KR | 10-2014-0110417 A | | 9/2014 |
| KR | 10-2019-0075694 A | | 7/2019 |
| WO | WO 2013/165053 A | | 11/2013 |

\* cited by examiner

UI

51

WIRELESS CHARGING DEVICE FOR SIMULTANEOUSLY CHARGING A PLURALITY OF USER TERMINALS BY PERFORMING TILT FUNCTION

CROSS-REFERENCE TO RELATED APPLICATION

The present disclosure claims priority to and the benefit of Korean Patent Application No. 10-2019-0082345, filed on Jul. 8, 2019, the disclosure of which is incorporated herein by reference in its entirety.

BACKGROUND

1. Field of the Invention

The present disclosure relates to a wireless charging device capable of efficiently charging one or more user terminals by performing a tilt function with respect to a portion where the user terminal is held.

2. Description of Related Art

Wireless charging methods may be performed by non-contact power transmitting devices and non-contact power receiving devices. In the wireless charging methods, power may be transferred from the non-contact power transmitting device to the non-contact power receiving device through an electromagnetic induction phenomenon between the two devices.

In order to use this method, user terminals including batteries, for example, mobile phones, tables, car keys, electronic cigarettes, and the like, may include the non-contact power receiving device. Accordingly, the battery of the user terminal may be charged based on the power transmitted by the non-contact power transmitting device.

However, through the wireless charging method in related art, one non-contact power transmitting device may supply power only to one user terminal, and the user terminal may be placed at a particular position of the non-contact power transmitting device for magnetic coupling between the non-contact power transmitting device and the user terminal, thereby having a very narrow chargeable physical range.

In order to solve this problem, the prior art document (Korean Patent No. 10-0976163) proposes a technique for extending a chargeable range, in a wireless charging method.

In the prior art document, in order to supply power stably even when the non-contact power receiving device moves partially on the non-contact power transmitting device, a primary core provided in the non-contact power transmitting device may include two different types of cores, and the two cores are partially overlap with each other, to form a multi-layer structure.

However, according to the above-described related art, not only magnetic field interference may occur due to overlapped cores, but even when the chargeable range of one non-contact power transmitting device is partially extended, power may not be simultaneously supplied to a plurality of non-contact power receiving devices.

SUMMARY OF THE INVENTION

The present disclosure provides a wireless charging device that may hold one or more user terminals by performing a tilt function with respect to a portion where the user terminal is held and may wirelessly charge the held user terminal.

The present disclosure also provides a wireless charging device that may adjust a position of the user terminal on a region where the wireless charging is performed by inserting the user terminal into a groove, which slides by performing the tilt function.

The present disclosure further provides a wireless charging device that performs simultaneous charging for a plurality of user terminals.

The present disclosure further provides a wireless charging device that outputs an interface corresponding to a signal received from the user terminal.

The objects of the present disclosure are not limited to the above-mentioned objects, and other objects and advantages of the present disclosure which are not mentioned may be understood by the following description and more clearly understood by the embodiments of the present disclosure. It will also be readily apparent that the objects and the advantages of the present disclosure may be implemented by features described in claims and a combination thereof.

According to the present disclosure, a tilt function may be performed with respect to a portion where the user terminal is held by coupling a terminal holder to a depression defined in a body using a hinge and the wireless charger may be disposed in the terminal holder, thereby wirelessly charging the held user terminal.

Further, according to the present disclosure, the groove may be defined in an inner surface at a lower portion of the depression to which the terminal holder is coupled using a hinge, so that the user terminal that slides by performing the tilt function is inserted into the groove. A depth and a height, of the groove, may be set based on an area and a thickness, of the user terminal, thereby adjusting the position of the user terminal in a region where the wireless charging is performed.

Further, according to the present disclosure, the wireless charger is provided in the terminal holder and the wireless charger may include a plurality of plate cores spaced apart from each other and a plurality of transmitting coils which are overlapped with one another, to perform the simultaneous charging with respect to the plurality of user terminals.

Further, according to the present disclosure, a response signal may be received from the user terminal through electromagnetic induction phenomenon that occurs between the wireless charger and the display may output a preset interface corresponding to the response signal, to output the interface corresponding to the signal received from the user terminal.

According to the present disclosure, one or more user terminals held in a tilted state may be wirelessly charged, thereby wirelessly charging the user terminal with various types of shapes in which user terminals are held and improving convenience in wireless charging.

Further, according to the present disclosure, the position of the user terminal may be set in the area where the wireless charging is performed so that the receiving coil in the user terminal may be disposed in a chargeable area, thereby improving charging efficiency.

Further, according to the present disclosure, a speed of charging of the terminal may be increased by performing simultaneous charging for a plurality of user terminals.

Further, according to the present disclosure, an interface corresponding to the signal received from the user terminal may be output, thereby improving user experience (UX) with respect to the wireless charging.

A specific effect of the present disclosure, further to the above-mentioned effect, is described together while describing specific matters to implement the present disclosure.

DETAILED DESCRIPTION OF EXEMPLARY EMBODIMENTS

Figure 1:
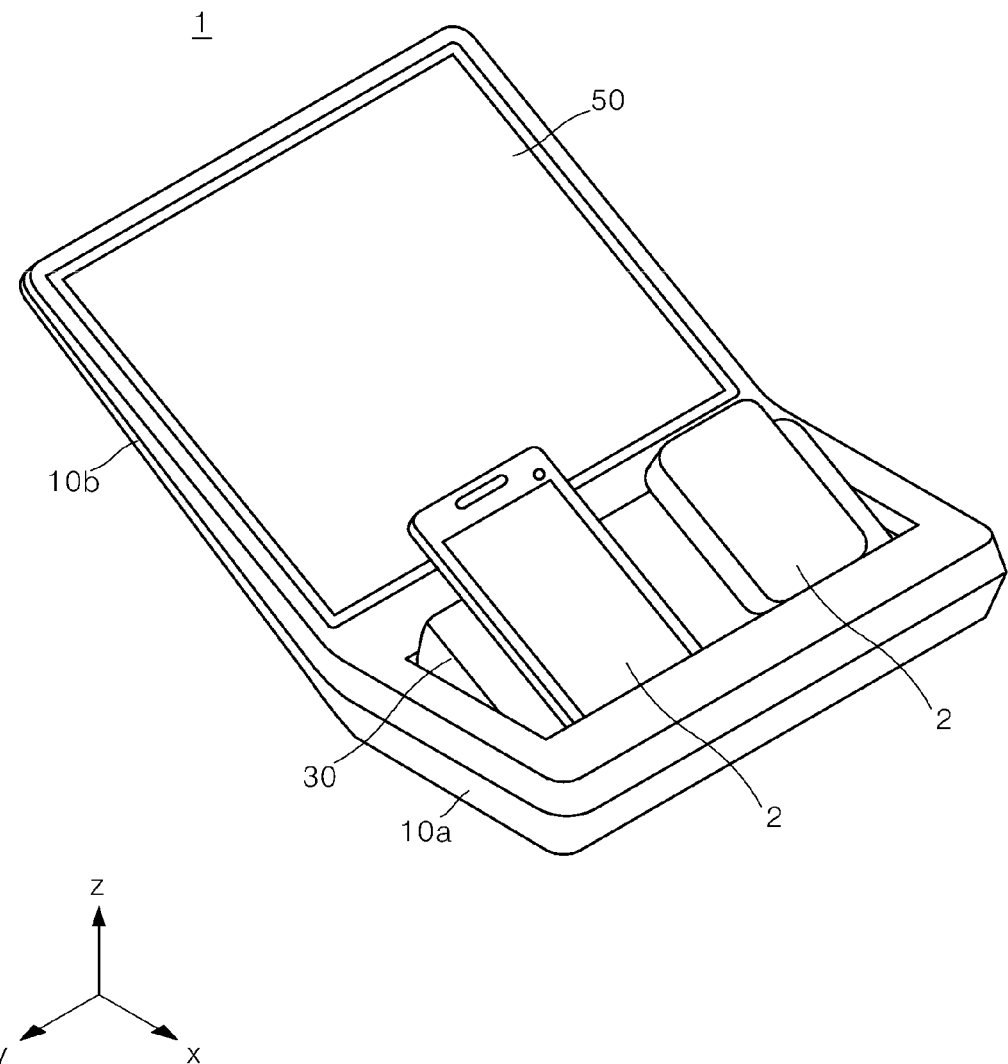
FIG. 1 shows a wireless charging device charging a plurality of user terminals according to an embodiment of the present disclosure.

The above-mentioned objects, features, and advantages of the present disclosure are described in detail with reference to the accompanying drawings. Accordingly, the skilled person in the art to which the present disclosure pertains may easily implement the technical idea of the present disclosure. In the description of the present disclosure, if it is determined that a detailed description of a well-known relevant technology of the present disclosure may unnecessarily obscure the gist of the present disclosure, the detailed description thereof is omitted. Preferred embodiments of the present disclosure are described in detail with reference to the accompanying drawings. In the drawings, same reference numerals are used to refer to same or similar components.

It will be understood that, although the terms "first", "second", and the like may be used herein to describe various components, however, these components should not be limited by these terms. These terms are only used to distinguish one component from another component. Thus, a first component may be a second component unless otherwise stated.

Hereinafter, when any component is arranged in "an upper portion (or a lower portion)" of the component or "on (or under") of the component, any component may be arranged in contact with an upper surface (or a lower surface) of the component, and another component may be interposed between the component and any component arranged on (or under) the component.

Further, when one component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Unless otherwise stated, each component may be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or may include additional components or steps.

In the present disclosure, unless otherwise stated, "A and/or B" means A, B or A and B.

The present disclosure relates to a wireless charging device capable of efficiently charging one or more user terminals by performing a tilt function with respect to a portion where the user terminal is held.

A wireless charging device according to an embodiment of the present disclosure is described below in detail with reference to FIGS. 1 to 14.

FIG. 1 shows a wireless charging device charging a plurality of user terminals according to an embodiment of the present disclosure.

Figure 2:
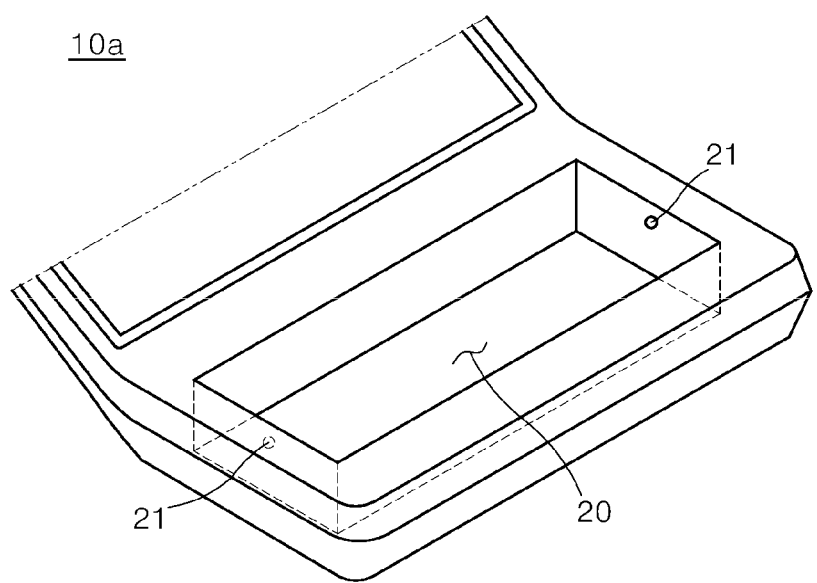
FIG. 2 shows a first body and a depression defined in the first body shown in FIG. 1.

FIG. 2 shows a first body and a depression defined in the first body shown in FIG. 1.

Figure 3:
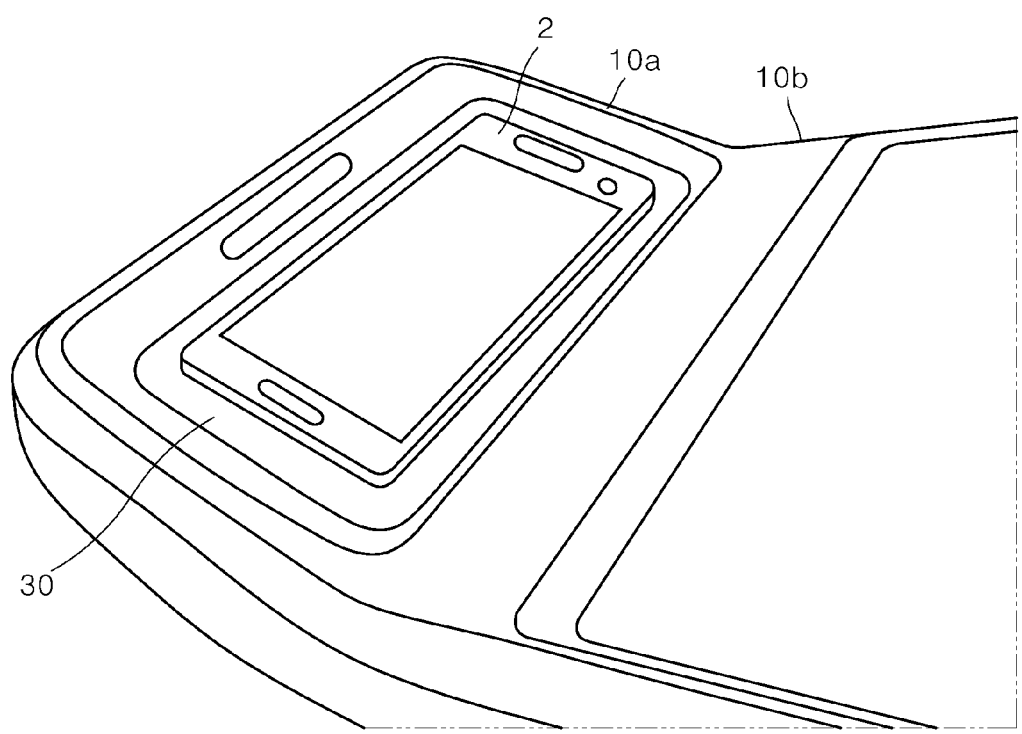
FIG. 3 shows one user terminal held by a terminal holder shown in FIG. 1.

FIG. 3 shows one user terminal held by the terminal holder shown in FIG. 1.

Figure 4:
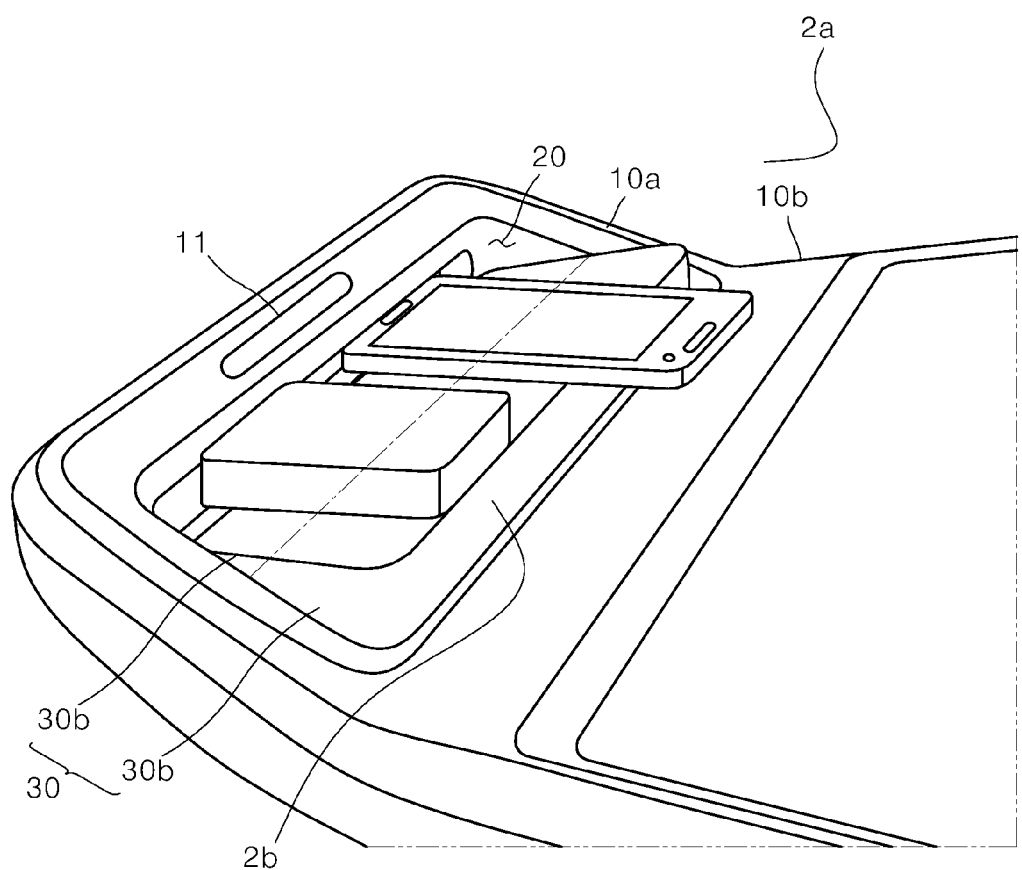
FIG. 4 shows two user terminals held by rotating one terminal holder shown in FIG. 3.

FIG. 4 shows two user terminals held by rotating one terminal holder shown in FIG. 3.

Figure 5:
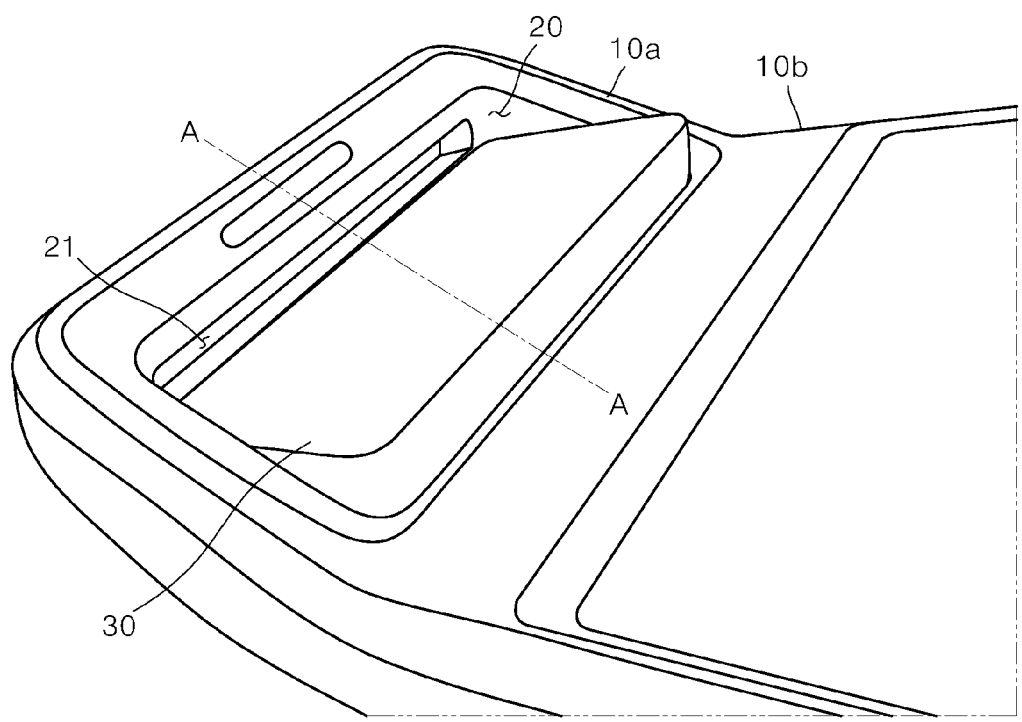
FIGS. 5 and 6 respectively show grooves defined in the depression shown in FIG. 2.
Figure 6:
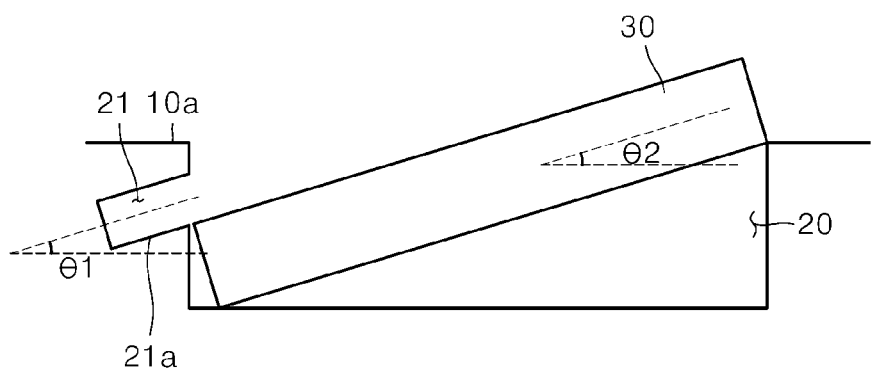

FIGS. 5 and 6 respectively show grooves defined in depression shown in FIG. 2.

Figure 7:
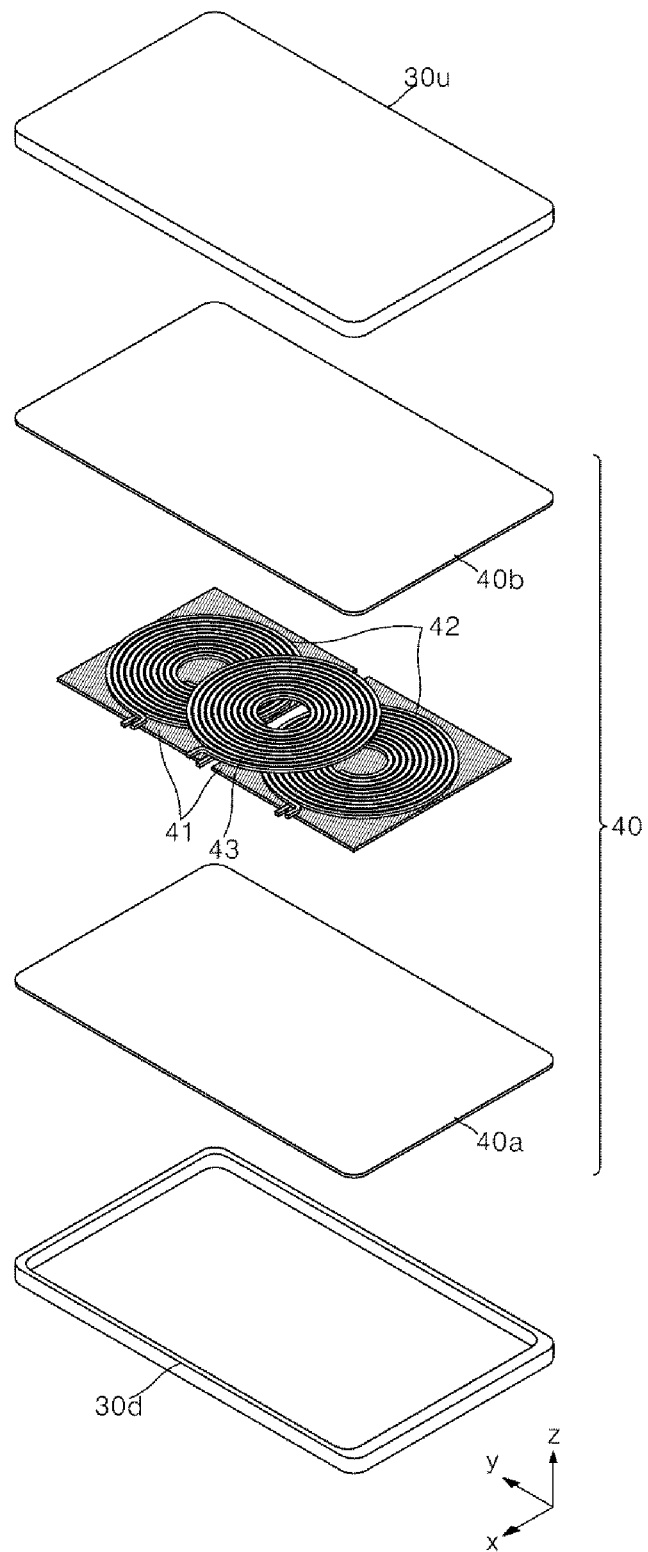
FIG. 7 shows an example of a wireless charger provided in a terminal holder.
Figure 8:
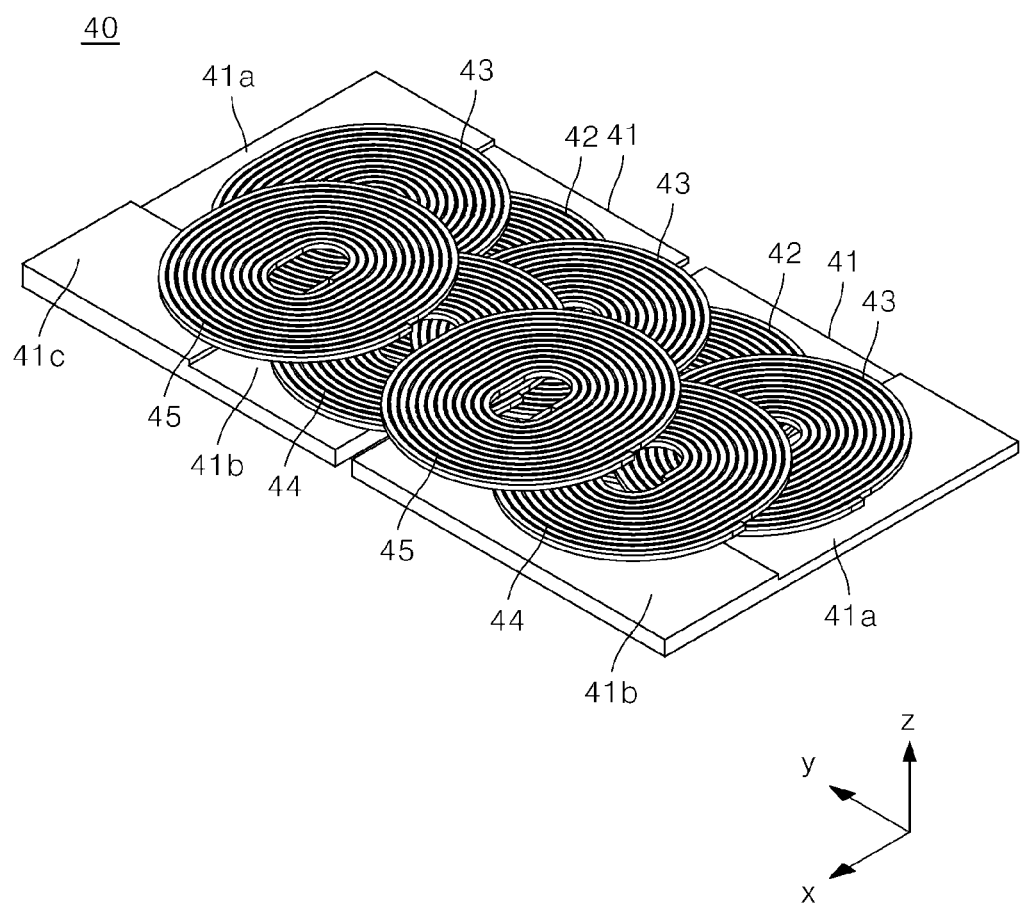
FIG. 8 shows another example of a wireless charger.

FIG. 7 shows an example of a wireless charger provided in the terminal holder. FIG. 8 shows another example of a wireless charger.

Figure 9:
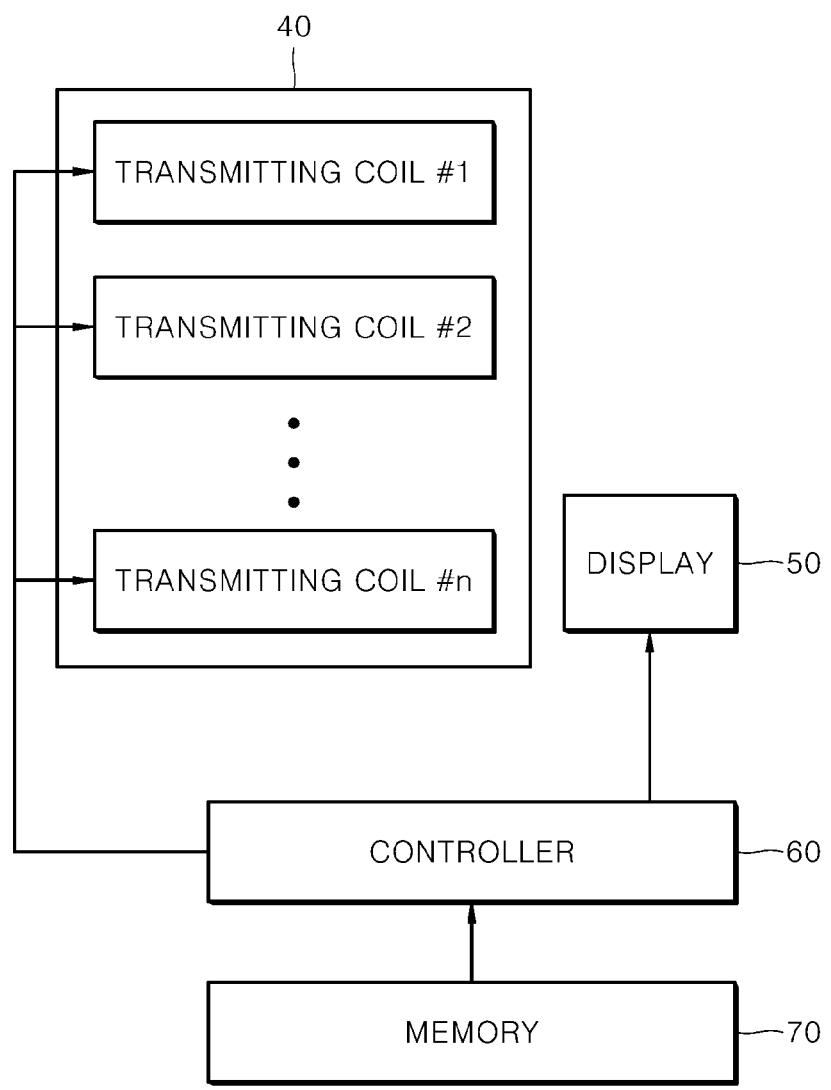
FIG. 9 shows a control flow of a controller.
Figure 10:
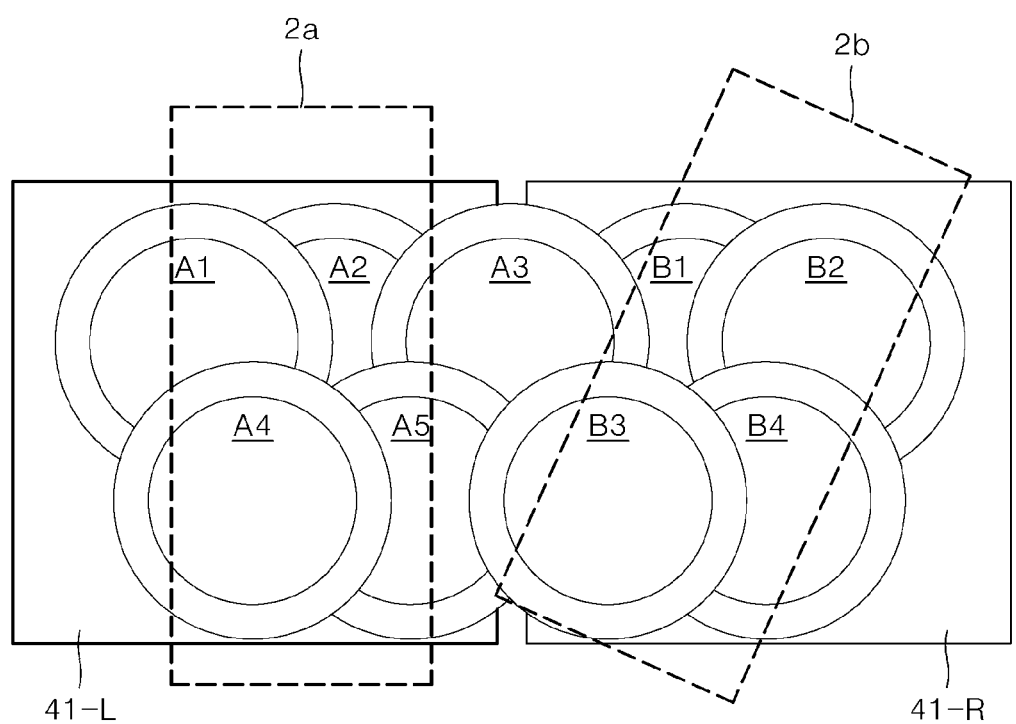
FIG. 10 shows a method for supplying power to each of user terminals when a plurality of user terminals are located on a wireless charger.

FIG. 9 shows a control flow of a controller. FIG. 10 shows a method of supplying power to each of user terminals when a plurality of user terminals are located on a wireless charger.

Figure 11:
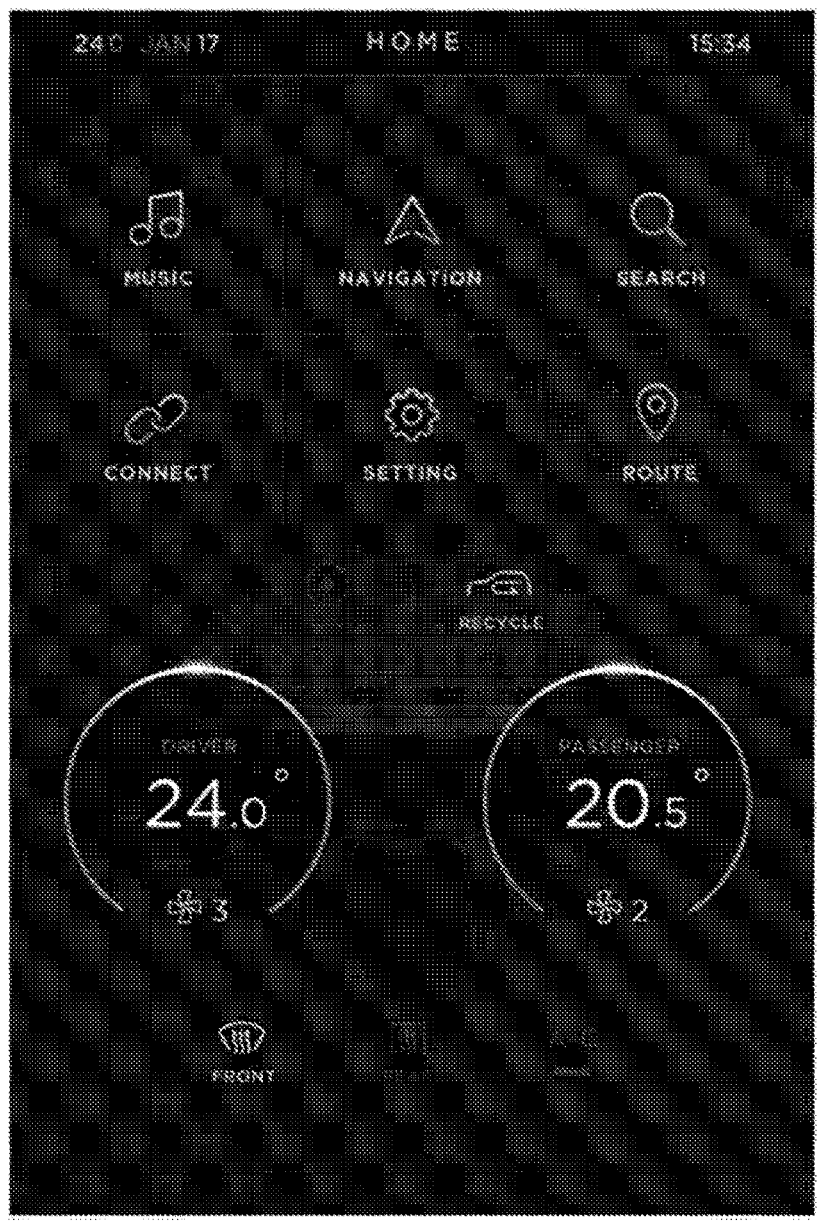
FIG. 11 shows a basic interface output by a display.
Figure 12:
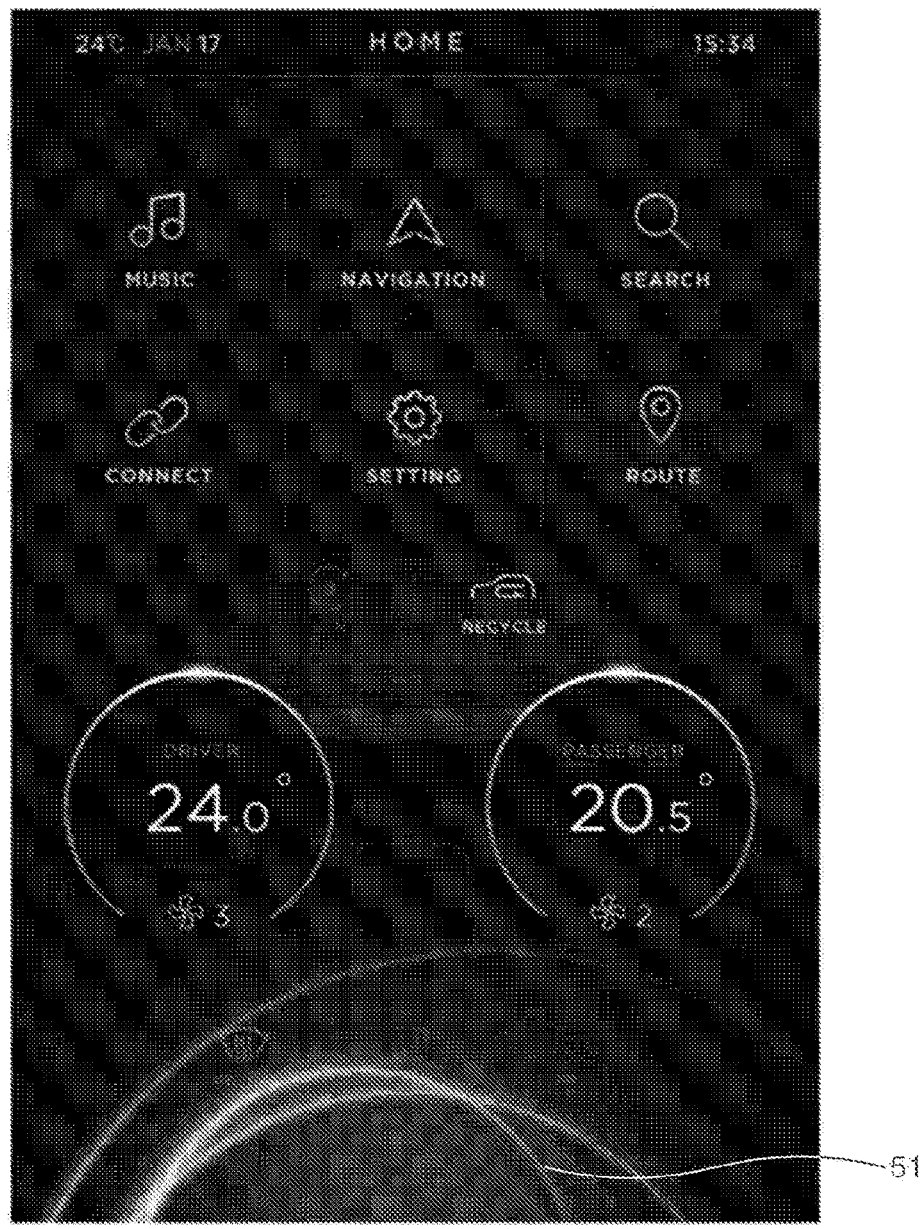
FIG. 12 shows a terminal sensing interface output by a display when a user terminal is close to a wireless charger.
Figure 13:
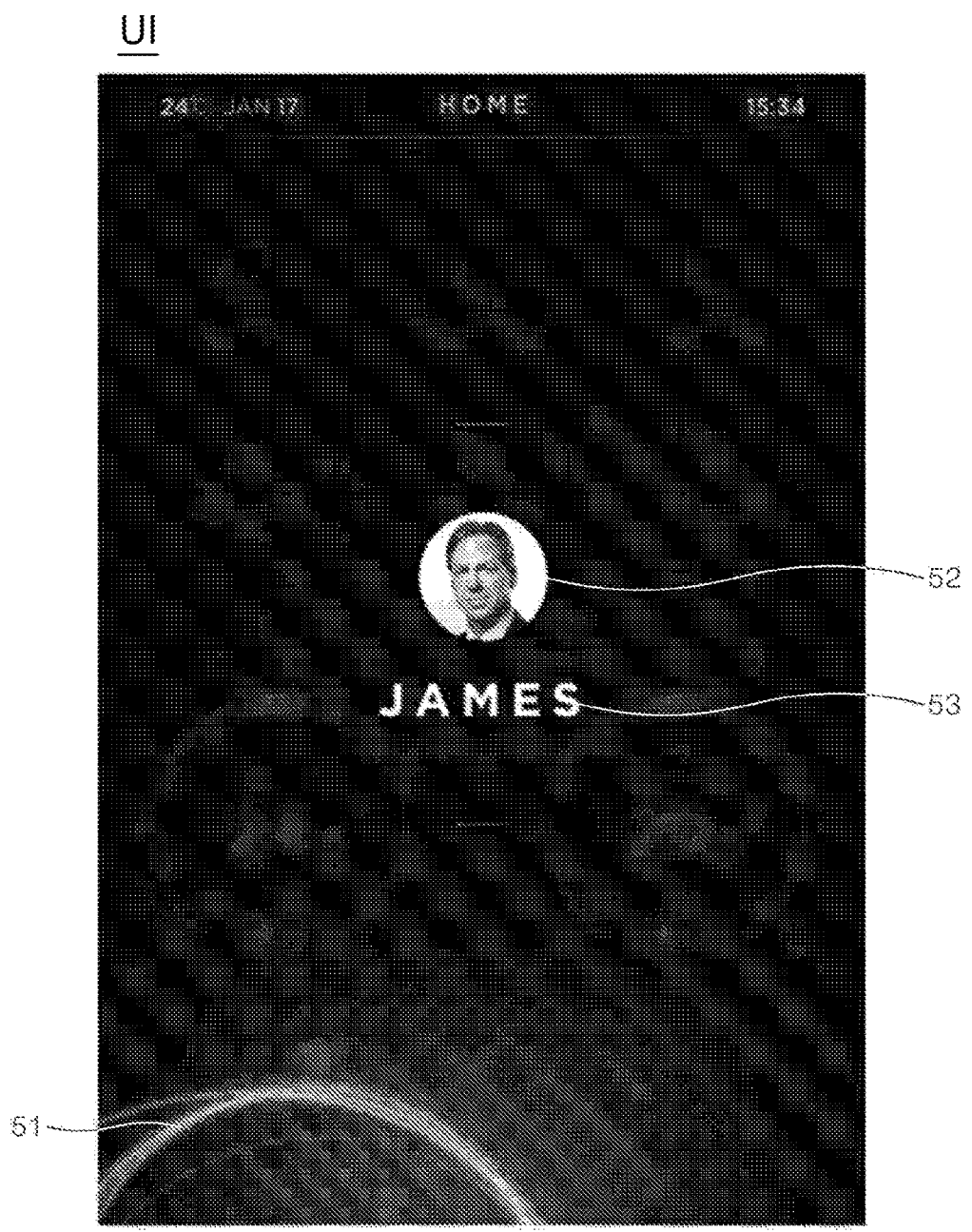
FIGS. 13 and 14 respectively show user and device sensing interfaces output by displays when user terminals are held on by terminal holders.
Figure 14:
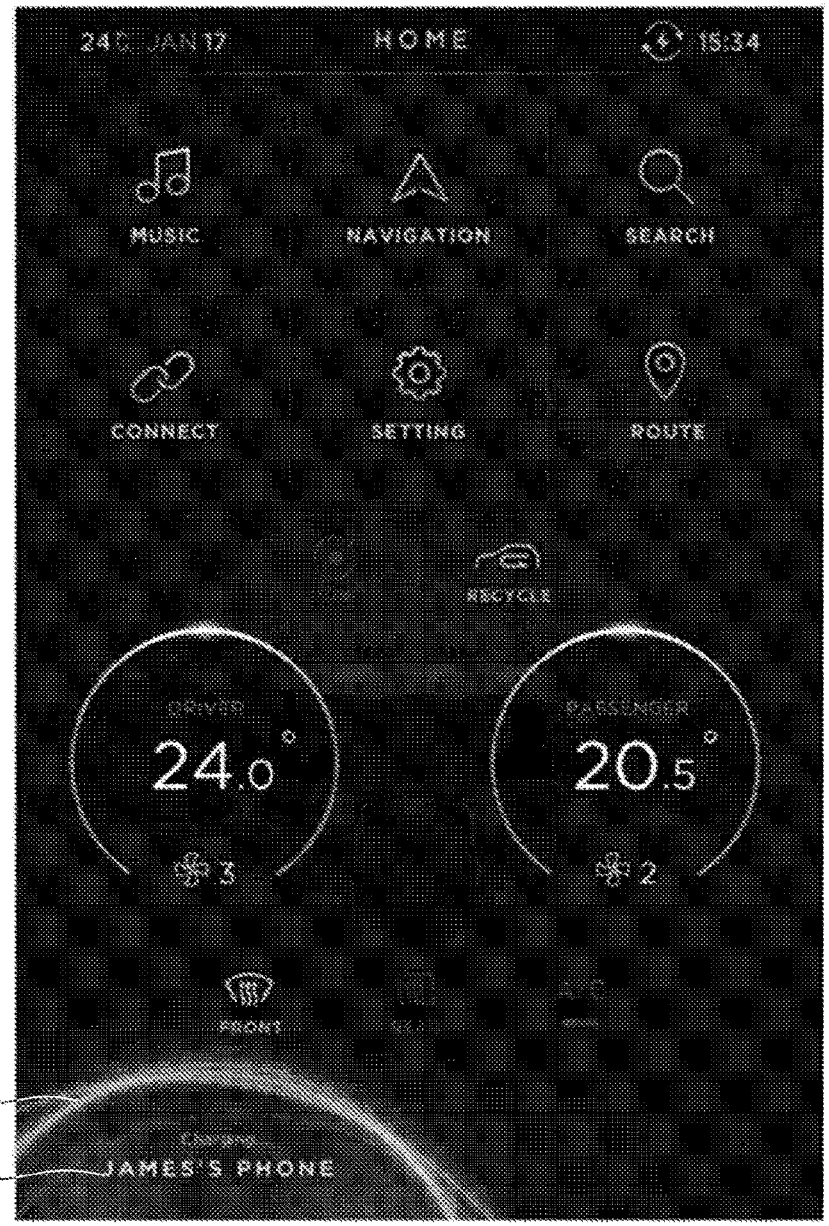

FIG. 11 shows a basic interface output by a display. FIG. 12 shows a terminal sensing interface output by a display when a user terminal is close to a wireless charger. FIGS. 13 and 14 respectively show a user and device sensing interface output by a display when user terminals are held by terminal holders.

Referring to FIG. 1, according to an embodiment of the present disclosure, a wireless charging device 1 may include a first body 10*a*, a second body 10*b*, a terminal holder 30, and a display 50. In one embodiment, FIG. 1 shows the wireless charging device 1, and components of the wireless charging device 1 are not limited to examples shown in FIG. 1, and some components may be added, changed or deleted as necessary.

The user terminal 2 may be held by the terminal holder 30 to receive power from the wireless charging device 1. The above configuration is described below with reference to FIGS. 7 to 10.

Meanwhile, as shown in FIG. 1, an x-axis direction is referred to as "a forward direction" and a −x-axis direction is referred to as "a rearward direction" and an y-axis direction is referred to as "a left-side direction" and a −y axis direction is referred to as "a right-side direction" and a z-axis direction is referred to as "an upward direction", and an −z-axis direction is referred to as "a downward direction"

The user terminal 2 is disposed in the first body 10a, which is required to be wirelessly charged. The first body 10a may be parallel to the ground. As shown in FIGS. 1 and 2, the first body 10a has a rectangular parallelepiped shape; however, the shape of the first body 10a may be changed to various types of shapes, for example, a cylinder and an elliptical cylinder, in aesthetic aspects.

The second body 10b may be connected to the first body 10a and may be inclined with respect to the first body 10a. More specifically, the second body 10b may be inclined forward with respect to the first body 10a.

In one example, as shown in FIG. 1, the second body 10b may be integrated with the first body 10a. In this case, the angle formed by the second body 10b with respect to the first body 10a may not be adjusted, and a connection member between the first body 10a and the second body 10b may not be present, thereby improving aesthetic quality.

In another example, the second body 10b may be coupled to one corner of the first body 10a using a hinge and may be inclined with respect to the first body 10a. In this case, the angle formed by the second body 10b with respect to the first body 10a may be adjusted based on a degree of rotation of the second body 10b with respect to a hinge shaft.

In another example, the second body 10b may be coupled to one corner of the first body 10a in an inclined state. More specifically, the first body 10a may have one end perpendicular to the ground, and the second body 10b may have inclined one end. At this time, one side of the first body 10a and one side of the second body 10b may be coupled to each other via any coupling member, so that the second body 10b may be inclined with respect to the first body 10a.

The display 50 may be provided in the second body 10b.

More specifically, the display 50 may be provided in the second body 10b to output a screen inclined forward. In consideration of aesthetic aspects, the display 50 to which the screen is output may have one end that is flush with the front surface of the second body 10b.

The display 50 may output various types of interfaces and the above configuration is described below with reference to FIGS. 11 to 14.

Referring to FIG. 2, a depression 20 may be defined in the first body 10a. As the terminal holder 30 described below is disposed in the depression 20, the shape of the depression 20 may correspond to the shape of the terminal holder 30. For example, as shown in FIG. 1, when the terminal holder 30 has a rectangular parallelepiped shape, the depression 20 may also have a rectangular parallelepiped shape.

The terminal holder 30 may be coupled to both inner surfaces of the depression 20 using a hinge.

To this end, a fastening member may be provided in an inner surface at both sides of the depression 20 to perform coupling using a hinge and the terminal holder 30 may be coupled to the fastening member and may be coupled to the inner surface at both ends of the depression 20 using a hinge.

For example, as shown in FIG. 2, a pair of hinge shafts may be provided at inner surfaces at both sides of the depression 20, and the terminal holder 30 may be coupled to the hinge shaft provided in both inner surfaces at both sides of the depression 20. More specifically, a pair of holes 21 may be provided in inner surfaces at both sides of the depression 20 which function as a hinge shaft. A pair of bosses may be provided at both sides of the terminal holder 30. In this case, the pair of bosses provided at both sides of the terminal holder 30 may be inserted into the pair of holes 21 provided in inner surfaces at both sides of the depression 20, so that the terminal holder 30 may be coupled to the depression 20 using a hinge.

On the contrary, a pair of bosses may be provided in inner surfaces at both sides of the depression 20, which functions as a hinge shaft, and a pair of holes 21 may be provided at both sides of the terminal holder 30. At this time, the pair of bosses provided in inner surfaces at both sides of the depression 20 is inserted into the pair of holes 21 provided at both sides of the terminal holder 30, so that the terminal holder 30 is coupled to the depression 20 using a hinge.

Further, the terminal holder 30 may be coupled to inner surfaces at both sides of the depression 20 using a hinge, so that the terminal holder 30 may rotate with respect to the first body 10a.

As described above, as the depression 20 is defined in the first body 10a and the terminal holder 30 is coupled to inner surfaces at both sides of the depression 20 using a hinge, the terminal holder 30 may selectively rotate about the first body 10a. In other words, the terminal holder 30 may not rotate or rotate when the terminal holder 30 is coupled to inner surfaces at both sides of the depression 20 using a hinge.

More specifically, the terminal holder 30 maintains a state in which the terminal holder 30 may not basically rotate (hereinafter; referred to as "a basic state"), and subsequently, a state (hereinafter; referred to as "a tilt state") of the terminal holder 30 may be changed to a state in which a terminal holder 30 rotates based on external input (e.g., user input).

Referring to FIG. 3, which shows the basic state, the upper surface of the terminal holder 30 may have a height identical to a height of the upper surface of the first body 10a, in the basic state. More specifically, a height from the ground to the upper surface of the terminal holder 30, in the basic state, may be identical to a height from the ground to the upper surface of the first body 10a.

As the terminal holder 30 does not protrude upward the first body 10a in the basic state, aesthetic qualities of the device may be improved as shown in FIG. 3. Further, as the terminal holder 30 is not depressed below the first body 10a, convenience may be improved when the user takes the user terminal 2 back, located on the terminal holder 30.

Meanwhile, in the basic state, in order to prevent left and right movement of the user terminal 2 held by the terminal holder 30, the upper surface of the terminal holder 30 may be made of an anti-slip material. Alternatively, a pad made of an anti-slip material may be attached to the upper surface of the terminal holder 30.

The anti-slip material may have a high coefficient of friction, among nonmagnetic materials, such as rubber, silicon, and the like, so as not to affect charging using the electromagnetic induction method described below. Referring to FIG. 4 showing the tilt state, when the terminal holder 30 rotates, an upper end 30a of the terminal holder 30 rises to an outside of the depression 20, and a lower portion 30b of the terminal holder may be lowered into the depression 20.

The terminal holder 30 may be changed to the tilt state based on external pressure (e.g., pressing, by a user, a button 11) applied to a button 11 provided in the first body 10a. Further, the state of the terminal holder 30 may be changed to the tilt state based on the external pressure applied to the upper surface of the terminal holder 30. Any physical elements may be further provided for this structural operation.

Meanwhile, the terminal holder 30 and the depression 20 may be connected to each other via any elastic member, for example, a rubber band, and a spring to prevent sudden movement of the terminal holder 30 when changes may occur between the basic state and the tilt state. Any physical elements may be further provided to connect the terminal holder 30 and the depression 20 via the elastic member.

The terminal holder 30 may be divided into an upper end 30a and a lower end 30b with respect to a rotational axis. For example, when the pair of bosses of the terminal holder 30 is coupled to the pair of holes 21 using a hinge shown in FIG. 2, the upper end 30a of the terminal holder 30 may be located at a rear side of the pair of holes 21 and the lower end 30b of the terminal holder 30 may be located at a front side of the pair of holes 21.

The terminal holder 30 may rotate such that the upper end 30a of the terminal holder 30 rises to the outside of the depression 20, and the lower end 30b of the terminal holder 30 is lowered into the depression 20. In other words, the upper end 30a of the terminal holder 30 may protrude toward outside of the depression 20 by raising relative to the rotational axis, and the lower end 30b may be depressed into the depression 20 by being lowered with respect to the rotational axis. Accordingly, the terminal holder 30 may form a predetermined angle with respect to the first body 10a.

As the lower end 30b of the terminal holder 30 is lowered into the depression 20, the user terminal 2 held by the terminal holder 30 may be held by the upper surface of the terminal supporter 30 and may slide to be fixed into the lower inner surface of the depression 20. Accordingly, as shown in FIG. 4, a plurality of user terminals 2 may be held by the terminal holder 30.

Meanwhile, the angle formed by the terminal holder 30 with respect to the first body 10a may be the same as the angle formed by the second body 10b with respect to the first body 10a.

Accordingly, the user terminal 2 held by the terminal holder 30 in the tilt state may be parallel to the display 50 embedded in the second body 10b. Due to this arrangement, visibility with respect to the screen output by the user terminal 2 and the screen output by the display 50 is improved.

As described above, according to the present disclosure, a variety of forms in which the user terminals are held may be provided by performing the tilt function, and it is possible to wireless charge the user terminal in various types of forms in which the user terminals are held described below, thereby improving convenience in wireless charging.

A groove 21 may be defined in the lower inner surface of the depression 20 along a longitudinal direction of the terminal holder 30. In this case, a longitudinal direction may correspond to the y-axis direction shown in FIG. 1.

Referring to FIG. 5, a groove 21 depressed forward along the longitudinal direction of the terminal holder 30 may be defined on the lower inner surface of the depression 20. At this time, a length of the groove 21 may be identical to a length of the terminal holder 30.

Meanwhile, the height of the groove 21 may be preset in consideration of the thickness of the user terminal 2, and the depth of the groove 21 may be preset in consideration of the area of the user terminal 2. More specifically, for wireless charging described below, a center of the transmitting coil of the wireless charger 40 provided in the terminal holder 30 may face a center of the receiving coil provided in the user terminal 2.

As the terminal holder 30 including the wireless charger 40 is fixedly installed, the user terminal 2 may be required to be inserted into the groove 21 so that the receiving coil in the user terminal 2 faces the transmitting coil included in the wireless charger 40.

Referring back to FIG. 4, a first user terminal 2a has a relatively greater area and a less thickness and the first user terminal 20 has the thickness less than the height of the groove 21 such that the first user terminal 2a is inserted into the groove 21. On the contrary, a second user terminal 2b has a relatively greater area and a greater thickness and the second user terminal 2b has the thickness greater than the height of the groove 21 such that the second user terminal 2b is not inserted into the groove 21.

When the first user terminal 2a is inserted into the groove 21, the position of the receiving coil provided in the first user terminal 2a may move forward based on a depth of the groove 21, compared to a case in which the groove 21 is not defined, and the receiving coil moved forward may face the transmitting coil included in the wireless charger 40. On the contrary, as the second user terminal 2b may not be inserted into the groove 21, the receiving coil provided in the second user terminal 21 may not move forward, and the receiving coil not moved forward may face the transmitting coil included in the wireless charger 40.

As described above, the height of the groove 21 may be set in advance so that only the relatively thin user terminal 2 may be selectively inserted, and the depth of the groove 21 may be set in advance based on the depth in which the user terminal 2 having the relatively greater area is inserted.

For example, the height of the groove 21 may decrease based on a depth of the groove 21.

In an example described with reference to FIG. 4, the greater a distance in which the user terminal 2 moves so that the receiving coil in the user terminal 2 faces the transmitting coil in the wireless charger 40, the greater an area of the user terminal 2.

Meanwhile, in general, the greater the area of the user terminal 2, the less the thickness of the user terminal 2. Accordingly, the groove 21 may have the height reduced based on the depth thereof so that the user terminal 2 is deeply inserted into the groove 21 based on a greater area and a less thickness of the user terminal 2.

With this structure, among two user terminals 2 that may be inserted into the groove 21, one user terminal 2a having a relatively greater area and a less thickness may be deeply inserted into the groove 21 so that the receiving coil in the user terminal 2 faces the transmitting coil in the wireless charger 40. On the contrary, the other user terminal 2b having a relatively less area and a greater thickness may be shallowly inserted into the groove 21 so that the receiving coil in the user terminal 2 faces the transmitting coil in the wireless charger 40.

The groove 21 may have a reference angle (θ1) with respect to the upper surface of the first body 10a.

Referring to FIG. 6, which shows a cross-section taken along line A-A' shown in FIG. 5, the groove 21 may form a reference angle (θ1) with respect to the upper surface of the first body 10a. The reference angle (θ1) may be set to any angle according to design needs.

In one example, the reference angle (θ1) may be set such that the bottom surface 21a of the groove 21 and the upper surface of the terminal holder 30 are flat when the terminal holder 30 rotates. In other words, the inner bottom surface 21a of the groove 21 and the upper surface of the terminal holder 30 may be disposed in a straight line, in the tilt state.

To this end, as shown in FIG. 6, the reference angle (θ1) formed by the groove 21 with respect to the upper surface of the first body 10a may be identical to an angle (θ2) formed by the terminal holder 30 with respect to the first body 10a, in the tilt state.

Through this structure, the user terminal 2 may be inserted into the groove 21 without a bending moment in the tilt state.

As described above, according to the present disclosure, the position of the user terminal 2 is set in the area where the wireless charging is performed based on a depth in which the user terminal 2 is inserted into the groove 21, thereby disposing the receiving coil in the user terminal 2 in the chargeable area (an area where the transmitting coil is disposed), thereby improving charging efficiency.

A structure of the wireless charger 40 and a process of receiving, by the user terminal 2 held by the terminal holder 30, power from the wireless charger 40 is described below in detail with reference to FIGS. 7 to 10.

Referring to FIG. 7, the above-described terminal holder 30 may include a wireless charger 40.

The wireless charger 40 may include at least one transmitting coil. Magnetic field may be generated in the transmitting coil through electromagnetic induction based on current flowing through the transmitting coil. The current may be induced into the receiving coil in the user terminal 2 based on the magnetic field, so that the battery in the user terminal 2 is charged.

However, according to the present disclosure, the wireless charger 40 may include a substrate 40 including a plurality of plate cores 41 and transmitting coils to supply the power to the plurality of user terminals 2 at the same time. More specifically, the wireless charger 40 may include a plurality of plate cores 41 disposed on the substrate 40a and spaced apart from one another, a first coil 42 disposed on each of the plurality of plate cores 41, and a second coil 43 disposed on the first coil to partially overlap with the first coil.

Further, according to the present disclosure, the wireless charger 40 may further include an EMI filter 40b disposed above the transmitting coil to supply stable power to the user terminal 2 by removing electrical noise generated by the transmitting coil.

Meanwhile, according to the present disclosure, both the first coil 42 and the second coil 43 may be collectively referred to as "a transmitting coil", but the first coil 42 and the second coil 43 may be named separately.

The plate core 41 may include a component having high permeability and that is not easily broken. More specifically, the plate core 41 may be made of amorphous metal such as cobalt (Co), iron (Fe), nickel (Ni), boron (B), silicon (Si), or a combination thereof, and may have a sheet shape or a thin film shape. For example, according to the present disclosure, the plate core 41 may be a ferrite core.

Accordingly, the plate core 41 may increase magnetic flux density of the magnetic field generated by the transmitting coil described below, and may efficiently define a magnetic path of a magnetic field.

The plate core 41 may be provided in plurality and may be placed on the substrate and the plurality of plate cores 41 may be spaced apart from each other. More specifically, the plurality of plate core 41 may be placed on the substrate and may be spaced apart by a predetermined distance in a planar direction (e.g., an x-axis and/or a y-axis).

The transmitting coil is a flat coil provided above the plate core 41 and may be wound clockwise or counterclockwise. Such coils may have a circular shape, an oval shape or a square shape. Connection terminals may be provided at both ends of the coil, and the connection terminal may be electrically connected to the controller 60 described below.

The transmitting coil may be divided into a first coil 42 and a second coil 43 according to the arrangement thereof. More specifically, the first coil 42 may be disposed on the plate core 41, and the second coil 43 may be disposed on another coil. Accordingly, the first coil 42 and the second coil 43 may be a single coil or may include a plurality of coils.

A structure of a wireless charger 40 including three coils is described with reference back to FIG. 7.

Referring to FIG. 7, the terminal holder 30 may include an upper case 30u and a lower case 30d that define an inner space of the terminal holder 30, and the wireless charger 40 may be provided in the inner space of the terminal holder 30.

The first coil 42 may include two coils placed on the plurality of plate cores 41 and spaced apart from each other. For example, as shown in FIG. 7, the plurality of first coils 42 may be disposed on the plate cores 41 in the areas formed by the plate cores 41 and may be spaced apart from each other. In other words, an area of the first coil 42 may be less than an area of the plate core 41, and the first coil 42 may be disposed in an area formed by the plate core 41, when viewed from the top.

Meanwhile, the second coil 43 may be disposed on the first coil 42 to partially overlap with all of the first coils 42 provided in plural and disposed on the plate core 41. In other words, as shown in FIG. 7, the second coil 43 partially overlaps with the first coil 42 disposed on any one of plate cores 41, and partially overlaps with the first coil 42 disposed on the other one of plate cores 41.

A structure of wireless charger 40 including nine coils is described with reference to FIG. 8. In FIG. 8, the terminal holder 30 and the substrate 40a are omitted from FIG. 7.

As mentioned above, the second coil 43 may be disposed on another coil. However, the second coil 43 is disposed on the first coil 42, and the third coil 44 is disposed on the second coil 43. The fourth coil 45 is described on the third coil 44.

Referring to FIG. 8, a total of nine coils may be disposed above two plate core 41 spaced apart from each other. Two first coils 42 may be disposed on plate cores 41 in areas formed by plate cores 41, and three second coils 43 may be disposed on the first coil 42 to partially overlap with the first coils 42.

More specifically, the second coil 43 on the left side of the three second coils 43 may be disposed on the first coil 42 to partially overlap with the first coil 42 on the left side, and the second coil 43 at the center may be disposed on the first coil 42 overlap each of the two first coil 42, the second coil 43 on the right may be disposed on the first coil 42 to partially overlap with the first coil 42 on the right side.

Further, the two third coils 44 may be disposed on the second coils 43 to partially overlap the second coils 43. More specifically, the third coil 44 on the left side of the two third coils 44 may be disposed on the second coil 43 to partially overlap with the second coil 43 on the left side and the center, and the third coil 44 on the right side may b e disposed on the second coil 43 to partially overlap with the second coil 43 provided at a center and the second coil 43 provided on the right side.

Finally, two fourth coils 45 may be disposed on the third coil 44 to partially overlap with the third coils 44. More specifically, the fourth coil 45 on the left side of the two fourth coils 45 may be disposed on the third coil 44 to partially overlap with the third coil 44 on the left side, and the four coils 45 provided on the right side may be disposed on the third coils 44 to partially overlap with the third coil 44 on the left side and the third coil 44 on the right side.

As described above, the second coil 43 is disposed on the first coil 42, the third coil 44 is disposed on the second coil 43, and the fourth coil 45 is disposed on the third coil 44. A height of the first coil may be different from a height of the fourth coil 45, above the plate core 41.

In order to prevent the above, height compensating cores 41*a*, 41*b*, and 41*c* may be disposed above the plurality of plate core cores 41 to compensate for height differences between coils. Any height compensating cores 41*a*, 41*b*, 41*c* may be disposed on the plate core 41, and may be disposed on other height compensating cores 41*a* and 41*b*.

As described above, as the height compensating cores 41*a*, 41*b*, and 41*c* are provided between the coils to compensate for the height difference between the coils, the coils may have the same level of inductance regardless of positions of coils.

The above-described wireless charger 40 may supply power to the user terminal 2 through electromagnetic induction. To this end, as shown in FIG. 9, according to the present disclosure, the wireless charging device 1 may further include a controller 60 that controls the wireless charger 40. More specifically, the controller 60 may supply power to the user terminal 2 by controlling each transmitting coil in the wireless charger 40.

Hereinafter, in order to explain the wireless charging under the control of the controller 60, it is assumed that the wireless charger 40 of the present disclosure has a structure including nine coils shown in FIG. 8.

The wireless charging device 1 may be connected to any external power source, and the controller 60 may apply a current to the transmitting coil in the wireless charger 40 based on the external power source.

The single user terminal 2 may receive power from any one of a plurality of transmitting coils in the wireless charger 40. More specifically, the single user terminal 2 may receive power from any one of the plurality of transmitting coils disposed on any one of the plate core 41.

Referring to FIG. 10, the plurality of transmitting coils in the wireless charger 40 may be grouped according to the position of the plate core 41. More specifically, an A group of transmitting coils may include transmitting coils A1 to A5 placed on a left plate core 41-L, and a B group of transmitting coils may include transmitting coils B1 to B4 placed on a right plate core 41-R.

The user terminal 2 may receive power from any one of plurality of transmitting coils disposed above the plate cores 41, which is closest to the receiving coil in the user terminal 2.

To this end, the wireless charger 40 may detect the position of the receiving coil in the user terminal 2. More specifically, the controller 60 may transmit a request signal by sequentially applying current to transmitting coils in the wireless charger 40 during a period of time for which transmitting coils are not overlapped with each other. The user terminal 2 received the request signal through the receiving coil may transmit a response signal, to each of transmitting coils, through the receiving coil. In other words, as the current is sequentially applied to transmitting coils, the response signal may be sequentially received through each of transmitting coils.

The controller 60 may detect an intensity of the response signal whenever the response signal is received. In other words, the controller 60 may detect the intensity of the response signal whenever the request signal is transmitted through each of transmitting coils. The controller 60 may determine the transmitting coil to which the current is applied based on the response signal having the greatest intensity being received, and may determine the identified transmitting coil as a transmitting coil closest to the receiving coil in the user terminal 2.

Referring to FIG. 10, for example, the controller 60 may sequentially apply current to the transmitting coils A1 to A5 in the wireless charger 40, and may sequentially apply current to the transmitting coils B1 to B4.

For example, when the first user terminal 2*a* is located on the left plate core 41-L, the intensity of the response signal received based on the current being applied to the transmitting coil A4 may be the greatest. Based on the intensity of the response signal, the controller 60 may determine that the first user terminal 2*a* is closest to the transmitting coil A4.

Accordingly, the controller 60 may determine the transmitting coil A4 as a transmitting coil to supply power, and wirelessly charge the first user terminal 2*a* by applying a current to the transmitting coil A4.

Further, for example, when the second user terminal 2*b* is located on the plate core 41-R on the right side, the intensity of the response signal received when the current is applied to the transmitting coil B2 may be the greatest. Based on the intensity of the response signal, the controller 60 may determine that the second user terminal 2*b* is closest to the transmitting coil B2.

Accordingly, the controller 60 may determine the transmitting coil B2 as a transmitting coil to supply power, and wirelessly charge the second user terminal 2*b* by applying a current to the transmitting coil B2.

As described above, as the wireless charger includes a plurality of transmitting coils disposed on separated cores and overlapped with one another, wireless power transmission using an electromagnetic induction phenomenon may be performed over a wide range.

That is, even when the user does not hold the user terminal 2 at a correct position of the terminal holder 30, the wireless charger 40 in the terminal holder 30 may supply the power to the user terminal 2 through any one of overlapped multiple transmitting coils, so that the wireless charging may be performed in a wide range formed by overlapping multiple transmitting coils.

Further, according to the present disclosure, the speed of charging the terminal is increased by performing simultaneous charging for the plurality of user terminals 2.

Meanwhile, as shown in FIG. 9, the controller 60 may control the display 50.

Referring to FIG. 11, the above-described wireless charging device 1 may be provided in a vehicle. In this case, the wireless charging device 1 may function as an Audio, Video, Navigation (AVN) device included in a human machine interface (HMI) in the vehicle. To this end, the controller 60 may control the display 50 to guide the function of the AVN device or to output a basic interface (UI) indicating a temperature set in air conditioning equipment.

Further, the controller 60 may control the display 50 based on a signal received through the wireless charger 40.

More specifically, the user terminal 2 may transmit a signal to the wireless charger 40 through the receiving coil. The controller 60 may identify the interface UI corresponding to the signal received at the wireless charger 40 with reference to the memory 70, and may control the display 50 to output the interface UI.

In one example, based on a request signal transmitted through the wireless charger 40, and a response signal received from the user terminal 2 in response to the request signal, the controller 60 may control the display 50 to output a preset interface UI corresponding to the response signal.

The controller 60 may control a current flowing through each coil included in the wireless charger 40 to transmit the request signal through electromagnetic induction. As the above configuration is described with reference to FIG. 10, a detailed description thereof is omitted.

Based on the user terminal 2 adjacent to the wireless charger 40, a response signal may be received at the wireless charger 40.

In this case, as shown in FIG. 12, when the response signal is received at the wireless charger 40, the controller 60 may control the display 50 to output the interface UI including a signal sensing image 50 at a lower end of the interface UI.

In another example, the controller 60 identifies any one of the plurality of transmitting coils included in the wireless charger 40 closest to the user terminal 2 and may control the display 50 to output the preset interface (UI) based on the identified position of the transmitting coil.

The controller 60 may transmit a request signal through a plurality of transmitting coils included in the wireless charger 40, and may identify any one of the transmitting coils closest to the user terminal 2 based on the intensity of the received response signal. As the identification method has been described above, a detailed description of the identification method is omitted.

For example, referring to FIG. 10, the controller 60 may identify a transmitting coil closest to the user terminal 2 as a transmitting coil A4. As the transmitting coil A4 is located on the left plate core 41-L, the controller 60 may control the display 50 to output a signal sensing image 51 to the lower left thereof as shown in FIG. 13.

In another example, the controller 60 may control the display 50 to output a preset interface UI based on any one of user information and device information included in the response signal.

The above-described response signal may include user information and device information. The user information may correspond to information indicating who the user of the user terminal 2 is. The device information may correspond to information indicating what kind of the user terminal 2 is.

The controller 60 may identify user information and device information included in the response signal and may identify an interface (UI) corresponding to the identified information with reference to a memory 70, and may control the display 5 to output the interface (UI).

Referring back to FIG. 13, the controller 60 may identify the user information based on the response signal, and may identify a photo image 52 and a text image 53 corresponding to the user information with reference to the memory 70. Subsequently, the controller 60 may control the display 50 to output an interface UI including the identified photo image 52 and the text image 53

Referring to FIG. 14, the controller 60 may identify the user information and the device information based on the response signal and may identify the text image 55 obtained in combination of a text corresponding to the user information and a text corresponding to the device information with reference to the memory 70. Subsequently, the controller 60 may output the display 50 to output the interface UI including the identified text image 55.

Meanwhile, as shown in FIG. 14, the controller 60 may control the display 50 to output the interface (UI) (e.g., the text image 55) corresponding to any one of user information and device information, at a position in which the above-mentioned signal sensing image 51 is output.

As described above, according to the present disclosure, an interface (UI) corresponding to a signal received from the user terminal 2 may be output, thereby improving user experience (UX) for the wireless charging.

Various substitutions, modifications, and changes may be made within the scope that does not deviate from the technical idea of the present disclosure for the skilled person in the art to which the present disclosure pertains, the above-mentioned disclosure is not limited to the above-mentioned embodiment and the accompanying drawings.

What is claimed is:

1. A wireless charging device, comprising:
   a first body;
   a depression defined in the first body;
   a pair of shafts including a first shaft and a second shaft;
   a terminal holder disposed within the depression in the first body, the terminal holder being coupled to a first inner surface of the depression via the first shaft and the terminal holder being coupled to a second inner surface of the depression opposite to the first inner surface via the second shaft;
   a wireless charger disposed in the terminal holder;
   a second body connected to the first body and inclined with respect to the first body;
   a display provided in the second body, and configured to display an image; and
   a groove extending into a third inner surface of the depression at an inclined angle with respect to the third inner surface, the third inner surface being connected to both of the first and second inner surfaces of the depression,
   wherein the terminal holder is configured to rotate with respect to the first body via the pair of shafts, and
   wherein the terminal holder is configured to rotate into a position having an upper surface of the terminal holder being substantially flush with a lower surface of the groove that extends into the third inner surface of the depression.

2. The wireless charging device of claim 1, wherein a height of an upper surface of the terminal holder is identical to a height of an upper surface of the first body.

3. The wireless charging device of claim 1, wherein, when the terminal holder rotates, an upper end of the terminal holder is raised to an outside of the depression, and a lower end of the terminal holder is lowered into the depression.

4. The wireless charging device of claim 1, wherein the groove extends along a longitudinal direction of the terminal holder.

5. The wireless charging device of claim 1, wherein the groove and has a height of the groove decreased based on a depth of the groove.

6. The wireless charging device of claim 1, wherein the groove and has a reference angle with respect to an upper surface of the first body.

7. The wireless charging device of claim 6, wherein, when the terminal holder rotates, a bottom surface of the groove and the upper surface of the terminal holder are flat.

8. The wireless charging device of claim 1, wherein, when the terminal holder rotates, an angle formed by the terminal holder with respect to the first body is identical to an angle formed by the second body with respect to the first body.

9. The wireless charging device of claim 1, wherein the wireless charger comprises:
   a plurality of plate cores spaced apart from one another;
   a first coil disposed on the plurality of plate cores; and
   a second coil disposed on the first coil to partially overlap with the first coil.

10. The wireless charging device of claim 1, further comprising a controller that controls the wireless charger,
    wherein the controller controls the display based on a signal received from the wireless charger.

11. The wireless charging device of claim 10, wherein the controller controls, based on a request signal transmitted by the wireless charger and a response signal received from the user terminal in response to the request signal, the display to output a preset interface corresponding to the response signal.

12. The wireless charging device of claim 11, wherein the controller transmits the request signal through electromagnetic induction by controlling a current flowing through each of coils included in the wireless charger.

13. The wireless charging device of claim 11, wherein the controller identifies any one of the plurality of transmitting coils included in the wireless charger, which is closest to the user terminal, and controls the display to output the preset interface based on an identified position of the transmitting coil.

14. The wireless charging device of claim 11, wherein the controller controls the display to output the preset interface based on any one of user information and device information included in the response signal.

15. The wireless charging device of claim 1, wherein the terminal holder has a rectangular bar shape, and
wherein the depression has a rectangular bar shape corresponding to the rectangular bar shape of the terminal holder.

16. The wireless charging device of claim 1, wherein the rectangular bar shape of the terminal holder is parallel to a lower edge of the display.

17. A wireless charging device, comprising:
a first body;
a depression defined in an upper surface of the first body;
a terminal holder disposed within the depression in the first body, the terminal holder being coupled to a first inner surface of the depression and a second inner surface of the depression opposite to the first inner surface;
a wireless charger disposed in the terminal holder;
a second body connected to the first body and inclined with respect to the first body;
a display provided in the second body, and configured to display an image; and
a groove extending into a third inner surface of the depression at an inclined angle with respect to the third inner surface, the third inner surface being connected to both of the first and second inner surfaces of the depression,
wherein the terminal holder is configured to rotate with respect to the first body,
wherein the terminal holder is configured to rotate into a position having a height of an upper surface of the terminal holder being identical to a height of the upper surface of the first body, and
wherein the terminal holder is configured to rotate into a position having an upper surface of the terminal holder being substantially flush with a lower surface of the groove that extends into the third inner surface of the depression.

18. A wireless charging device, comprising:
a first body;
a depression defined in the first body;
a terminal holder disposed within the depression in the first body, the terminal holder being coupled to a first inner surface of the depression and a second inner surface of the depression opposite to the first inner surface;
three wireless power transmitting coils disposed in the terminal holder;
a second body connected to the first body and inclined with respect to the first body;
a display provided in the second body, and configured to display an image; and
a groove extending into a third inner surface of the depression at an inclined angle with respect to the third inner surface, the third inner surface being connected to both of the first and second inner surfaces of the depression,
wherein the terminal holder is configured to rotate with respect to the first body into a position having a first end of the terminal holder being raised outside of the depression and a second end of the terminal holder opposite to the first end being concealed within the depression, and
wherein the terminal holder is configured to rotate into a position having an upper surface of the terminal holder being substantially flush with a lower surface of the groove that extends into the third inner surface of the depression.

19. The wireless charging device of claim 18, wherein the lower surface of the groove and the display in the second body are both inclined in a same direction.

* * * * *